United States Patent [19]
Baumann et al.

[11] Patent Number: 4,966,206
[45] Date of Patent: Oct. 30, 1990

[54] DEVICE FOR FILLING A GASEOUS FUEL CONTAINER

[75] Inventors: Heinz Baumann; Heinz Mutter, both of Winterthur; Kurt Schreiber, Dietlikon, all of Switzerland; Peter Thurig, Brampton, Canada

[73] Assignee: Sulzer Brothers Limited, Winterthur, Switzerland

[21] Appl. No.: 223,284

[22] Filed: Jul. 22, 1988

[30] Foreign Application Priority Data

Jul. 23, 1987 [CH] Switzerland ............... 02810/87
Feb. 17, 1988 [CH] Switzerland ............... 00582/88

[51] Int. Cl.$^5$ ............................................. B65B 31/00
[52] U.S. Cl. .......................................... 141/83; 137/79;
  141/98; 141/37; 141/4; 141/82
[58] Field of Search ................. 141/98, 69, 82, 71,
  141/37, 834; 48/190, 191; 137/79

[56] References Cited

U.S. PATENT DOCUMENTS

| | | | |
|---|---|---|---|
| 573,996 | 12/1896 | Owen | 48/191 |
| 1,611,429 | 3/1923 | Fish | 48/190 |
| 2,829,492 | 4/1958 | Klenman | 137/79 |
| 3,738,609 | 6/1973 | Divigard | 137/79 |
| 3,817,299 | 6/1974 | Koehler | 141/82 |
| 3,837,377 | 9/1974 | McJones | 141/4 |
| 4,277,254 | 7/1981 | Hanson | 48/190 |
| 4,522,159 | 6/1985 | Engel et al. | 48/190 |
| 4,527,600 | 7/1985 | Fisher et al. | 141/4 |
| 4,531,558 | 7/1985 | Engel et al. | 141/44 |
| 4,582,100 | 4/1986 | Poulsen | 141/82 |
| 4,705,082 | 11/1987 | Fanshawe et al. | 141/82 |

FOREIGN PATENT DOCUMENTS

| | | | |
|---|---|---|---|
| 1806525 | 6/1969 | Fed. Rep. of Germany | 137/79 |
| 2489477 | 3/1982 | France | 137/79 |
| 0907335 | 2/1983 | U.S.S.R. | |
| 2142709 | 1/1985 | U.S.S.R. | 137/79 |

Primary Examiner—Ernest G. Cusick
Attorney, Agent, or Firm—Kenyon & Kenyon

[57] ABSTRACT

The filling device houses a compressor which is connected via a suction line comprising an inlet shut-off valve to a source of gaseous fuel, and is adapted to be connected to a gaseous-fuel container via a supply line equipped with a pressure-limiting valve and a discharge valve. The inlet valve and the discharge valve are connected to a control device which together with the pressure-limiting valve, the discharge valve and, if required, the inlet valve is disposed in a pressure-resistant casing connected to a discharge line leading away from the device. The control device is adapted to be influenced in dependence on control signals from a temperature sensor detecting the environmental temperature, a pressure sensor detecting the pressure at which the compressor is supplied, and a pressure-difference sensor disposed in front of the inlet valve and detecting the difference between the pressure in the suction line and in the casing. This device enables the supply pressure to be automatically adapted to the environmental temperature, and prevents uncontrolled escape to gaseous fuel near the filling device.

27 Claims, 4 Drawing Sheets

DEVICE FOR FILLING A GASEOUS FUEL CONTAINER

This invention relates to a device for filling a gaseous fuel container.

Heretofore, various types of devices have been known for the filling of a gaseous fuel container. For example, such devices have been known to use a compressor for compressing the gaseous fuel with the compressor adapted to be connected on a suction side via a suction line having an inlet shut-off valve to a source of gaseous fuel, such as a natural gas line and adapted on the pressure side to be connected to a gaseous fuel container which is to be filled via a supply line having a pressure-limiting valve adjustable to a predetermined maximum pressure of the compressed gaseous fuel.

In devices of this kind, for example, installations for filling vehicles driven by gaseous fuel, the fuel, such as natural gas delivered at a pressure of 10 mbar, has been compressed to a filling pressure of, for example, 200 bar when filling the gas container. However, a problem in such cases, particularly in areas or under operating conditions with large fluctuations in ambient temperature, is that correspondingly large fluctuations occur in the pressure of the filled gaseous fuel container. For example, if gas is introduced into the gaseous-fuel container of a vehicle at a filling pressure of 200 bar at an ambient temperature of $-20°C$., and if the vehicle is parked in an area at a temperature of e.g. $+20°C$., the gas will be at a pressure of about 300 bar. The filling pressure must therefore be adapted to the local temperature conditions, i.e. must be suitably reduced at low ambient temperatures. The installations hitherto required for this purpose have been relatively expensive and need to be carefully operated by experts in order to obtain the required reliability in operation, both of the refueling installation and of the fuel container to be filled, when handling explosive gaseous fuel.

Accordingly, it is an object of the invention to provide a filling device which is simple to operate and which automatically adjusts the filling pressure of the gaseous fuel to the local ambient temperature.

It is another object of the invention to provide a filling device which is reliable in operation.

It is another object of the invention to be able to automatically adjust the filling pressure of gaseous fuel into a container.

Briefly, the invention provides a device for filling a gaseous fuel container which comprises a casing having an inlet line for receiving a flow of gaseous fuel from a source of gaseous fuel, a first discharge line for supplying a flow of compressed gaseous fuel to a gaseous fuel container and a second discharge line for expelling a flow of compressed gaseous fuel. In addition, a compressor is disposed for compressing the flow of gaseous fuel. This compressor has a suction line for receiving a flow of the gaseous fuel and an outlet line for supplying a flow of compressed gaseous fuel to the first discharge line of the casing. Further, an inlet shut-off valve is disposed in the inlet line of the casing while a pressure-limiting valve is connected to the outlet line of the compressor and which is adjustable to a predetermined maximum pressure of the compressed gaseous fuel. In like fashion, a discharge valve is also connected to the outlet line of the compressor.

In accordance with the invention, a temperature sensor is disposed outside the casing for generating a signal in response to ambient temperature. A pressure sensor is also connected to the suction line of the compressor for generating a signal in response to the pressure of the gaseous fuel therein. Also, a pressure difference sensor is provided for generating a signal in response to a difference in pressure between the fuel pressure in the inlet line of the casing and the pressure inside the casing.

A control device is disposed in the casing and is connected to each of the three sensors in order to receive signals from each. This control device is also connected to the inlet valve and discharge valve in order to control the inlet valve and discharge valve in dependence on the signals received from the sensors.

During operation of the device, the gas pressures in the suction line to the compressor can be adjusted to predetermined values corresponding to local operating conditions largely independently of voluntary intervention. This particularly reduces the risk of a faulty manipulation of a plant employing the device as well as the risk of explosion, for example, through over-filling of the container or through an unchecked escape of gas.

These and other objects and advantages of the invention will become more apparent from the following detailed description taken in conjunction with the accompanying drawings wherein:

FIG. 1 diagrammatically illustrates a filling device constructed in accordance with the invention;

Figure 7:
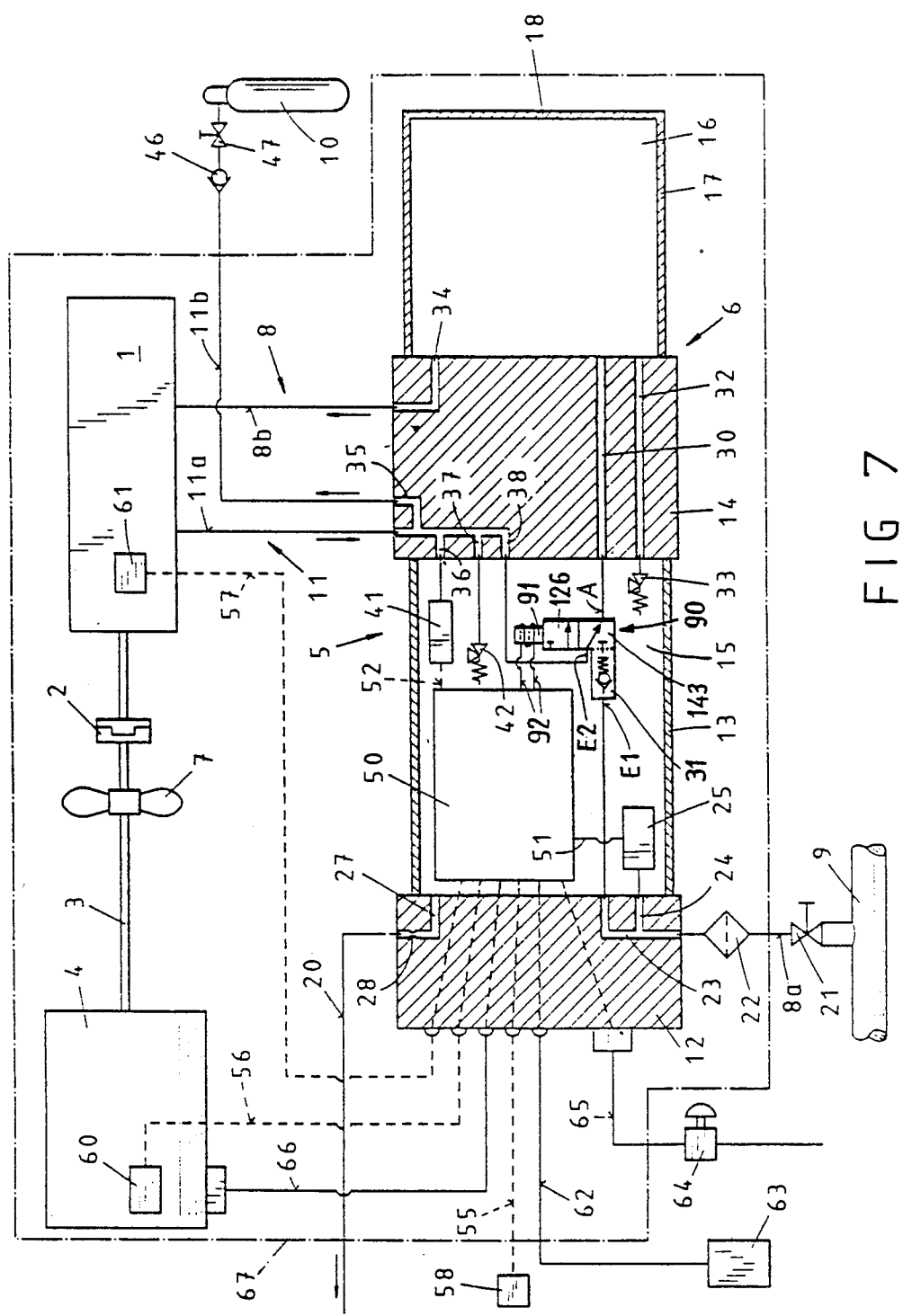

FIG. 7 diagrammatically illustrates a further modified filling device in accordance with the invention.

Figure 1:
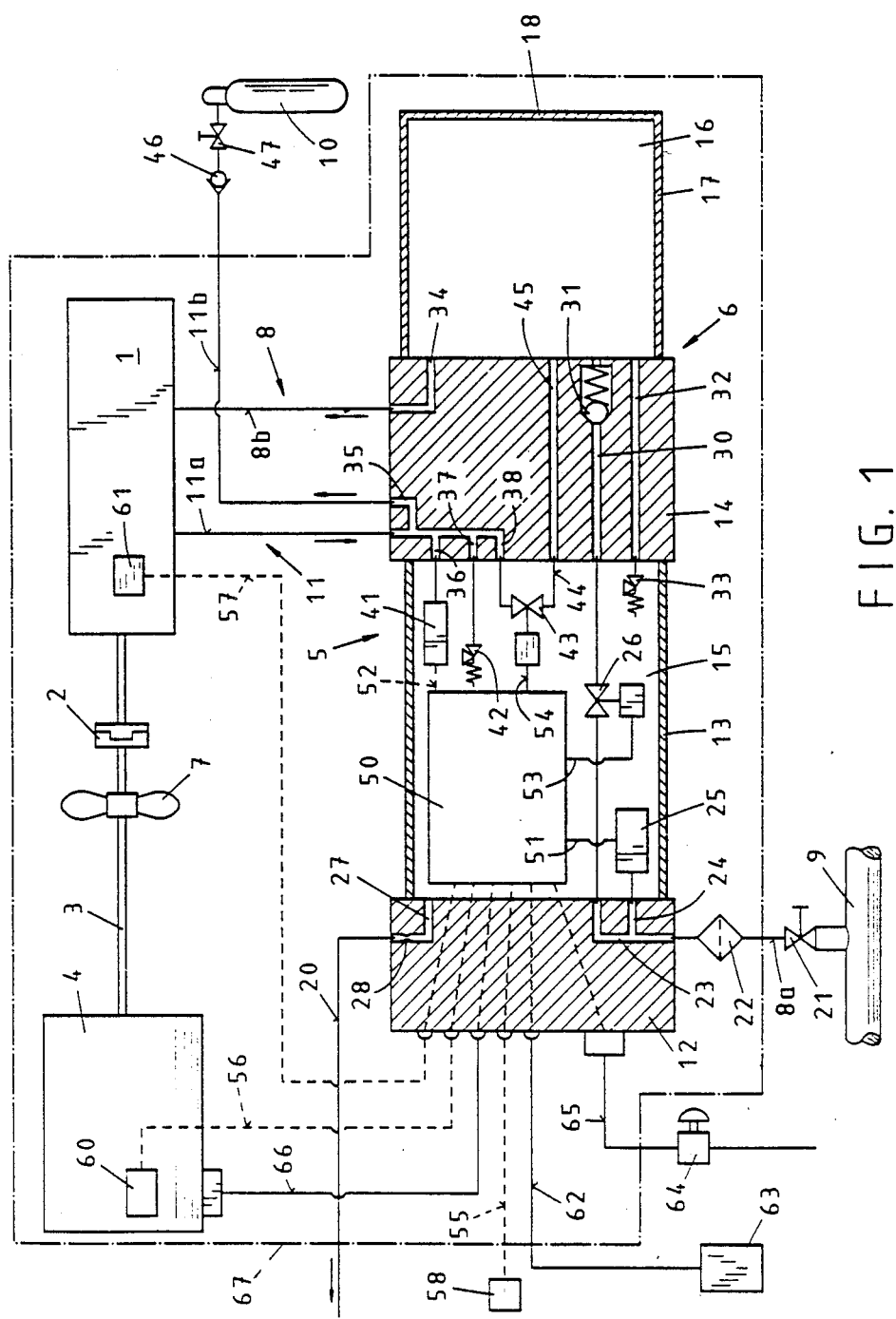

Referring to FIG. 1, the filling device includes a compressor 1 which is connected by a coupling 2 to a drive shaft 3 of a motor 4 and a safety unit 5 which is connected to the compressor 1 and disposed in a pressure-tight casing 6. The drive shaft 3 may have an impeller 7 for cooling the compressor 1.

As indicated, the compressor 1 and safety unit casing 6 are housed within a casing 67 having an inlet line 8a for receiving a flow of gaseous fuel from a source of gaseous fuel, for example, a natural gas line 9 either directly or via a manual shut-off means 21. The casing 67 also has a discharge line 11b for supplying a flow of compressed gaseous fuel to a gaseous fuel container 10, for example, via a shut-off means adapted to contain, for example, a non-return valve 46 and a manual shut-off valve 47. In addition, the casing 67 has a second discharge line 20 for expelling a flow of compressed gaseous fuel as described below.

The compressor 1, which can have any suitable construction, e.g. a multistage reciprocating compressor, can be connected at the suction side via a suction line 8b to the source of gaseous fuel while the pressure side which corresponds to the last stage in a multistage compressor, can be connected via an outlet line 11a to the gaseous fuel container 10 to be filled, e.g. the fuel tank of a vehicle (not shown).

The casing 6 comprises a fittings chamber 15 and a buffer chamber 16 which are separated by a partition wall 14. The fittings chamber 15 is bounded by a first end wall 12, a cylindrical side wall 13 and the partition wall 14 while the buffer chamber 16 is bounded by the partition wall 14, a cylindrical side wall 17 and a second end wall 18. As indicated, the walls 12, 14 are constructed as distribution blocks. Wall 12 has peripheral connection places for the discharge line 20 and the inlet line 8a whereas the partition wall 14 has a plurality of flow channels which extend to the periphery of the wall 14 and connect to the suction-line 8b leading to the compressor, the outlet line 11a from the compressor 1 and the discharge line 11b of the casing 6 for supplying a flow of compressed gaseous fuel to the gaseous fuel container 10.

The inlet line 8a acts as a first portion of a suction line 8, and has a filter 22 for removing any impurities in the natural gas and is connected to two flow channels 23, 24 formed in the end wall 12 and respectively connected to the inlet side of an inlet shut-off valve 26 disposed in the fittings chamber 15 or to a pressure-difference sensor 25 in the fittings chamber 15. The discharge line 20 is connected to the fittings chamber 15 via a flow channel 27 in the end wall 12 which contains a restrictor 28 and extends away from the immediate neighborhood of the filling device, e.g. over a roof (not shown) covering the device. The outlet side of the valve 26 is connected to a flow channel 30 formed in the partition wall 14 and is connected by a non-return valve 31 to the buffer chamber 16.

The buffer chamber 16 is connected via a flow channel 32 formed in the partition wall 14 to a safety valve 33 disposed in and opening into the fittings chamber 15 and adjustable to a preset maximum value of the pressure prevailing in the buffer chamber 16. Chamber 16 is also connected via another flow channel 34 to the suction line 8b leading to the compressor 1.

The outlet line 11a and discharge line 11b define a supply line 11 and are interconnected via flow channels 35, 36, 37, 38 formed in the partition wall 14 and are also connected to a group of fittings disposed in the chamber 15. The group of fittings comprise a pressure sensor 41, a pressure-limiting valve 42 opening into the fittings chamber 15 and adjustable to a preset maximum pressure of the compressed gaseous fuel, and a shut-off discharge valve 43 whose outlet side is connected to the buffer chamber 16 via a discharge line 44 and a flow channel 45 formed in the partition wall 14.

An electronic control device 50, likewise disposed in the fittings chamber 15, is connected via signal lines 51, 52 respectively to the pressure-difference sensor 25 or the high-pressure sensor 41, and by control lines 53, 54 respectively to an actuator, e.g. a servomotor or electromagnet, of the inlet valve 26 or of the discharge valve 43. The control device 50 is also connected via signal lines 55, 56, 57 through the end wall 12 of the casing 6 to respective temperature sensors 58, 60, 61 and via a control line 62 to a switch device 63 and via an electric circuit 65 and emergency switch 64 to an electric current source (not shown). The motor 4 is connected by another electric circuit 66 to the control device 50. One temperature sensor 58 is disposed at a distance from the filling device, preferably outside the casing 67, to detect the ambient temperature at the place where the filling installation is installed, whereas the other temperature sensors 60, 61 are disposed on the motor 4 and the compressor 1, respectively.

The filling device is started up by a switching device 63, actuated e.g. by a key, whereupon the discharge valve 43 of the supply line 11 is closed via control line 54, the inlet valve 26 of suction line 8 is opened via control line 53 and the motor 4 is switched on via electric circuit 66, by means of switching units (not shown) contained in the control device 50. When the shut-off means 21 is opened, natural gas supplied at a pressure of e.g. 10 mbar from line 9 is conveyed through the non-return valve 31 to the buffer chamber 16 and through suction-line 8b to the compressor 1, compressed to a preset supply pressure and delivered through supply line 11 to the gaseous fuel container 10. The supply pressure is limited to a maximum value of e.g. 230 bar by the pressure-limiting valve 42. By means of the control device 50, the supply pressure during operation is limited to a value corresponding to the ambient temperature, in accordance with control signals from the pressure sensor 41 of supply line 11 and the temperature sensor 58 which detects the ambient temperature. The appropriate pressure can be e.g. 100 bar at an ambient temperature of $-40°C$. and e.g. 200 bar at a temperature of $+20°C$., with corresponding limiting and intermediate values associated with each preset temperature range.

Depending on the temperature/pressure function supplied to the control device 50, when the operating supply pressure (e.g. 150 bar) corresponding to the ambient temperature is reached, the inlet valve 26 of suction line 8 is closed, the discharge valve 43 of supply line 8 is opened and motor 4 is switched off by the control device 50 influenced by the corresponding signals of pressure sensor 41 and temperature sensor 58. The compressed gaseous fuel remaining in the compressor 1 and in the suction line 11 closed by the non-return valve 46 flows through the opened discharge valve 43 and through the discharge channel 45 into the buffer chamber 16, where a pressure of e.g. 2–3 bar builds up, limited by the safety valve 33. When this pressure is exceeded, a corresponding amount of gaseous fuel is conveyed through flow channel 32 and safety valve 33 to the fittings chamber 15 and thence, after a corresponding delay by restrictor 28, through discharge line 20 to a place at a distance from the filling plant and discharged to atmosphere.

Correspondingly, if the maximum supply pressure set by valve 42 is exceeded, the gas flowing out through valve 42 into chamber 15 is discharged through line 20.

The filling device can also be automatically switched off by the control device 50, even before reaching the supply pressure corresponding to the environmental temperature. If the pressure in the supply line 11 does not rise after the compressor 1 has been switched on, or falls below a preset value when compressor 1 has been switched on, a signal for closing the inlet valve 26, for opening the discharge valve 43 and for switching off the motor 4 can be triggered in dependence on a corresponding signal from the pressure sensor 41 in the control device 50. Corresponding switching-off signals can be triggered by the pressure-difference sensor 25 if the pressure rises in casing 15 after valve 42 responds, or if the input pressure of gaseous fuel in inlet-line 8a is too low. Other shut-off signals can be transmitted by the corresponding temperature sensor 60, 61 to the control device if a temperature preset in a measuring range of the motor 4 and/or compressor 1 is exceeded. Of course, the filling device can also be switched off beforehand by the switching device 63 or the emergency switch 64.

Figure 2:
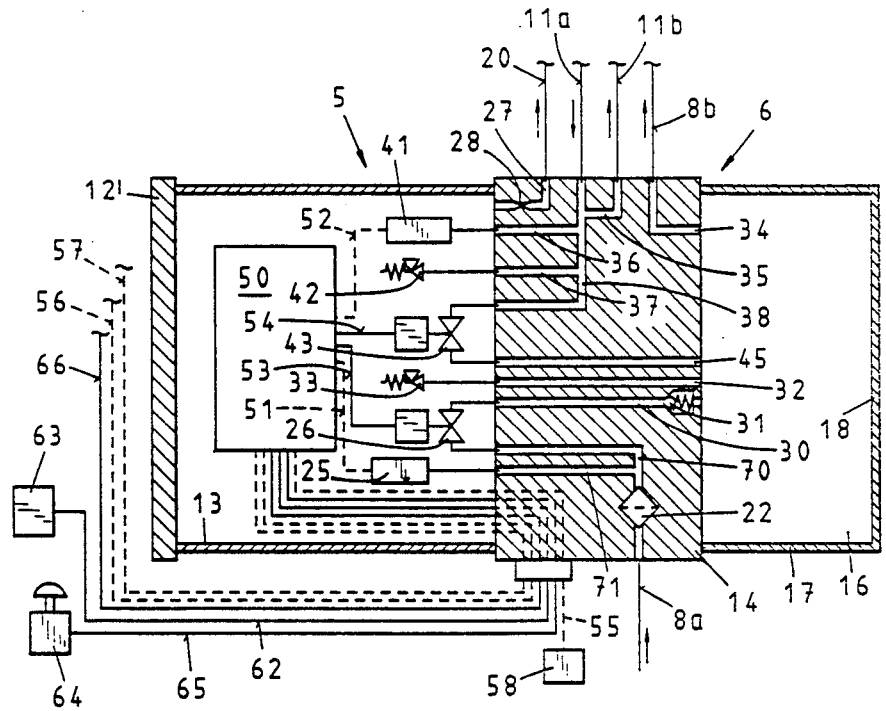
FIG. 2 illustrates a modified filling device constructed in accordance with the invention.

FIG. 2 shows an embodiment in which the inlet side of the inlet valve 26 and the pressure-difference sensor 25 are connected to flow channels 70, 71 respectively formed in the partition wall 14. Flow channel 71 is connected to the flow channel 70, which is connected by a filter 22 disposed in the partition wall 14 to the inlet line 8a connected to the periphery of partition 14. In this embodiment, the signal lines 55, 56, 57 leading to the temperature sensors 58, 60, 61, the control line 62 and the electric circuit 65 are conveyed through the partition wall 14 to the fittings chamber 15, which is bounded by an end wall 12, which does not have any flow channels or pipe bushings and can therefore be made correspondingly thin.

In the embodiments in FIGS. 1 and 2, all the fittings essential for controlling the filling device and through which the gaseous fuel flows are disposed, together with the associated connecting and switching-places, in the pressure tight chamber 15. As this chamnber 15 has only a few, relatively easily-sealed external connections, the chamber 15 is therefore simple in construction and reliably encloses those parts of the filling device which are at risk of explosion, e.g. if the seals are defective.

Figure 3:
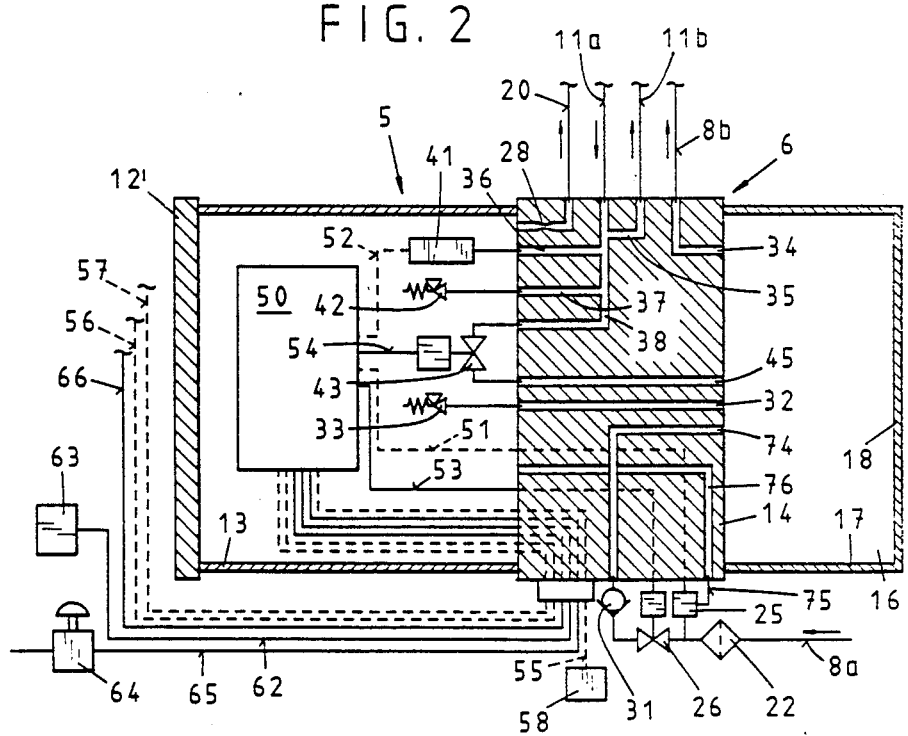
FIG. 3 illustrates a further modified filling device constructed in accordance with the invention.

As shown in FIG. 3, wherein like reference characters indicate like parts as above, an embodiment is also possible in which only the fittings exposed to the highest pressure are disposed in chamber 15, whereas the fittings (sensor 25, valve 26 and valve 31) exposed to a lower gaseous-fuel pressure, e.g. 2–3 bar, are disposed outside the casing 6 and connected at the periphery of the partition wall 14 to a flow channel 74 leading directly to the buffer chamber 16. A sensor line 75 detecting the pressure in chamber 15 can lead from the pressure-difference sensor 25 to the fittings chamber 15 or, as shown in FIG. 3, to the flow channel 75 formed in the partition wall 14 and connected to chamber 15.

Figure 4:
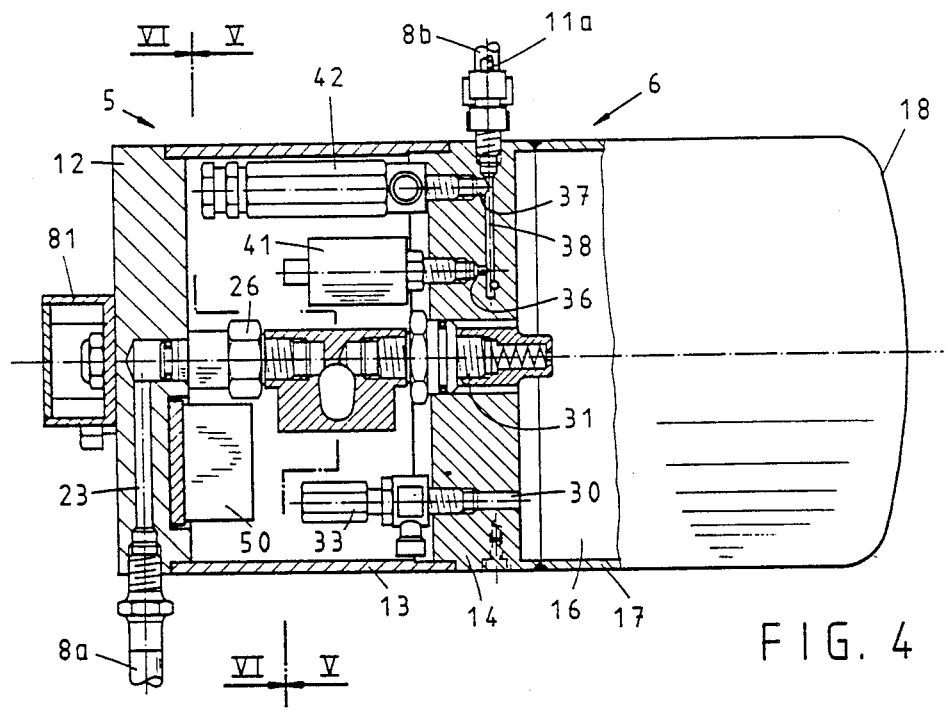
FIG. 4 illustrates a detailed view of a portion of the filling device of FIG. 1.
Figure 5:
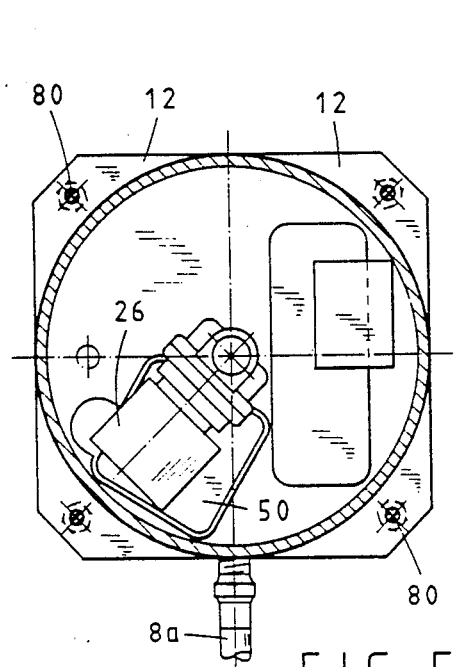
FIG. 5 illustrates a view taken on line V—V of FIG. 4.
Figure 6:
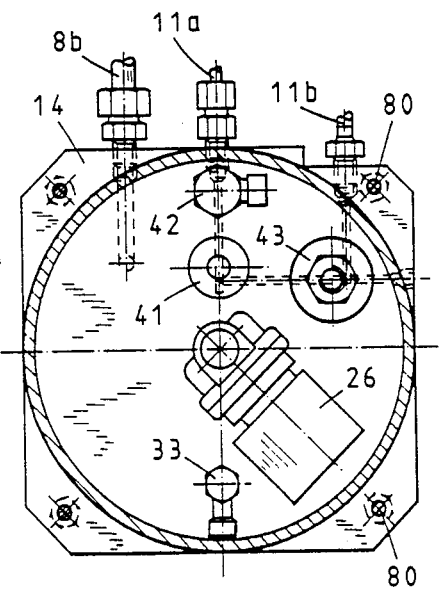
FIG. 6 illustrates a view taken on line VI—VI of FIG. 4.

Referring to FIGS. 4, 5 and 6 wherein like reference characters indicate like parts as above, the safety unit 5 has the end wall 12 and the partition wall 14 clamped together by bolts 80 via the side wall 13, which is inserted between them in sealing-tight manner. The side wall 17 and the end wall 18 of the buffer chamber 16 form a cap-like part welded to the partition wall 14. The inlet valve 26 is screwed into a bore in end wall 12 and connected to flow channel 23. The control device 50 and a terminal box 81 for the signal and control-line connections are secured to the end wall 12. The safety valve 43 and the pressure-limiting valve 42 are screwed in respective bores in partition wall 14. The non-return valve 31 is disposed in a bore in partition wall 14 and screwed into a bore in valve 26.

In the previously-described embodiments, the inlet valve 26 of suction line 8 and the discharge valve 43 of supply line 11 can be influenced by two independently controllable actuators, one of the two valves 26, 43 being open at any time whereas the corresponding other valve is closed. In the embodiment shown in FIG. 7, an inlet valve 126 and a discharge valve 143 form a common change-over means 90 adjustable between two switch positions by an actuator 91. The change-over means 90, which can be a 3/2-way valve as shown has a first input E1 connected to the flow channel 23 of suction line 8, a second input E2 connected to the flow channel 38 of the supply line 11, and an output A connected to the flow channel 30 of the suction line 8. When the changeover means 90 is in one switch position (not shown in FIG. 7), its first input E1 is connected to output A and its second input E2 is automatically blocked, whereas in the other switch position, shown in FIG. 7, the second input E2 is connected to output A and the first input E1 is automatically blocked.

In this embodiment, the non-return valve 31 is disposed at the inlet side of means 90. The non-return valve 31 can be a separate inserted part, connected in front of changeover means 90, or can be incorporated in means 90 as shown. The actuator 91 of means 90 is connected by control lines 92 of the control device 50. The actuator 91 can be a servomotor or, as shown, a lifting electromagnet.

By means of the switching device 63 actuated in the manner described, the changeover means 90 is moved from the switch position shown into the switch position for blocking the connected portion of supply line 11, and connecting the flow channel 23 of suction line 8 to the flow channel 30, and motor 4 is switched on via electric circuit 66. Correspondingly, when the operating supply pressure corresponding to the environmental temperature is reached or when the pressure in the supply line 11 fails to rise or falls below a preset value after switching on the compressor 1, the changeover means 90 is moved by the control device 50 out of the position connecting the two flow channels 23, 30 or suction line 8 and into the position shown in FIG. 7, in which the inlet line 8a is blocked and the outlet line is connected to flow channel 30. Motor 4 is switched off at the same time.

During the adjusting process, the non-return valve 31 associated with the inlet side of the changeover means 90 prevents the gaseous fuel at the supply pressure from overflowing from the supply line 11 into the inlet line 8a. When the non-return valve 31 is incorporated in the casing of changeover means 90 as shown, an overflow of the gaseous fuel from the second input E2 to the first input E1 is already prevented inside the casing.

When the means 90 is in the switch position shown, the compressed gaseous fuel remaining in compressor 1 and in the supply line 11 closed by the non-return valve 46 flows through the flow channel 30 to the buffer chamber 16.

The embodiment in FIG. 7 can ensure in simple manner that when the discharge valve 143 is closed, the inlet valve 126 is reliably opened, the main effect being reliably to avoid the risk of air being sucked through compressor 1.

The invention thus provides a device for filling a gaseous fuel container which is simple to operate and which automatically adjusts the filling temperature of the gaseous fuel to the local ambient temperature.

Further, the invention provides a filling device which is able to operate in a reliable manner.

What is claimed is:

1. A device for filling a gaseous fuel container, said device comprising a first casing having an inlet line for receiving a flow of gaseous fuel from a source of gaseous fuel, a first discharge line for supplying a flow of compressed gaseous fuel to a gaseous fuel container and a second discharge line for expelling a flow of compressed gaseous fuel;

a compressor in said casing for compressing a flow of gaseous fuel, said compressor having a suction line for receiving a flow of gaseous fuel from said inlet line and an outlet line for supplying a flow of compressed gaseous fuel to said first discharge line;

an inlet shut-off valve in said inlet line;

a second pressure tight casing within said first casing;

a pressure-limiting valve within said second casing connected to said outlet line of said compressor, said pressure limiting valve being adjustable to a predetermined maximum pressure of the compressed gaseous fuel;

a discharge valve within said second casing connected to said outlet line of said compressor;

a temperature sensor outside said first casing for generating a signal in response to ambient temperature;

a pressure sensor within said second casing connected to said outlet line of said compressor for generating a signal in response to the pressure of the gaseous fuel therein;

a pressure difference sensor within said second casing for generating a signal in response to a difference in pressure between the fuel pressure in said inlet line of said first casing and the pressure inside said second casing; and a control device in said second casing connected to each of said sensors to receive each said signal therefrom, said control device being connected to said inlet valve and said discharge valve to control said inlet valve and said discharge valve in dependence on said signals.

2. A device as set forth in claim 1 wherein said second casing has a fittings chamber having said pressure-limiting valve, said discharge valve and said control device disposed therein; a buffer chamber disposed in communication with and between said inlet valve and said suction line and disposed in communication with said discharge valve to receive a flow of gaseous fuel therefrom; and a partition wall separating said chambers from each other, and which further comprises a safety valve in said fittings chamber and adjustable to a preset maximum pressure, said safety valve being disposed in communication with said buffer chamber to vent said buffer chamber.

3. A device as set forth in claim 1 wherein said partition wall is a distribution block having a plurality of flow channels therein; one of said flow channels communicating said buffer chamber with said suction line on a periphery of said block; at least some of said flow channels extending to a periphery of said block and being in communication with said outlet line and said first discharge line; and at least others of said flow channels communicating said buffer chamber with an outlet side of said inlet valve and an inlet side of each of said discharge valve and said safety valve.

4. A device as set forth in claim 3 wherein said pressure sensor is disposed in said fittings chamber.

5. A device as set forth in claim 3 wherein said pressure difference sensor is disposed in said fittings chamber.

6. A device as set forth in claim 2 wherein said inlet valve is disposed outside said first casing.

7. A device as set forth in claim 3 wherein said second discharge line is connected to said fittings chamber via one of said flow channels in said partition.

8. A device as set forth in claim 3 wherein said second casing includes an end wall opposite said partition wall and having a flow channel therein connected with said second discharge line and said fittings chamber.

9. A device as set forth in claim 8 further comprising a restrictor in said second discharge line.

10. A device as set forth in claim 8 wherein said inlet line of said first casing extends through said end wall to an inlet side of said inlet valve.

11. A device as set forth in claim 3 wherein the inlet side of said inlet valve is connected to one of said flow channels in said partition wall and said inlet line for connecting to the source of gaseous fuel is connected to said flow channel in the peripheral region of said partition wall.

12. A device as set forth in claim 3 which further comprises
a first channel communicating said outlet line with said pressure sensor;
a second channel communicating said outlet line with said pressure-limiting valve; and
a third channel communicating said outlet line with an inlet side of said discharge valve.

13. A device as set forth in claim 3 which further comprises a second inlet shut-off valve within said first casing and outside said second casing, said second shut-off valve being disposed in said inlet line and connected at a periphery of said partition wall to one of said flow channels.

14. A device as set forth in claim 2 wherein said pressure-difference sensor is disposed in said fittings chamber.

15. A device as set forth in claim 1 wherein said inlet valve and said discharge valve form a common change-over means, and which further comprises a single actuator connecting said change-over means to said control device and being adjustable between two switch positions, said actuator having a first input connected to an upstream portion of said suction line, a second input connected to said outlet line and an output connected to a downstream portion of said suction line whereby in a first switch position of said change-over means said first input is connected to said output and said second input is blocked, whereas in a second switch position said second input is connected to said output and said first input is blocked.

16. A device as set forth in claim 15 whereon said change-over means is a three/two-way valve.

17. A device as set forth in claim 15 which further comprises a non-return valve disposed in an upstream portion of said suction line adjacent said changeover means.

18. A device as set forth in claim 15 which comprises a non-return valve incorporated in said changeover means.

19. A device as set forth in claim 1 which further comprises a non-return valve in said suction line.

20. A device as set forth in claim 19 wherein said non-return valve is disposed in a flow channel connected to an outlet side of said inlet valve.

21. A device for filling a gaseous fuel container, said device comprising
a casing having an inlet line for receiving a flow of gaseous fuel from a source of gaseous fuel, a first discharge line for supplying a flow of compressed gaseous fuel to a gaseous fuel container and a second discharge line for expelling a flow of compressed gaseous fuel;
a compressor for compressing a flow of gaseous fuel, said compressor having a suction line for receiving a flow of gaseous fuel and an outlet line for supplying a flow of compressed gaseous fuel to said first discharge line;
a safety unit in said casing having a fittings chamber in communication with said second discharge line, a buffer chamber and a partition wall separating said chambers, said inlet line passing through said fittings chamber into said buffer chamber to deliver gaseous fuel thereto;

an inlet shut-off valve in said inlet line;

a press-limiting valve connected to said outlet line of said compressor and disposed in said fittings chamber, said pressure limiting valve being adjustable to a predetermined maximum pressure of the compressed gaseous fuel;

a discharge valve connected to and between said outlet line of said compressor and said buffer chamber for selectively venting gaseous fuel from said outlet line to said buffer chamber;

a temperature sensor outside said casing for generating a signal in response to ambient temperature;

a pressure sensor connected to said outlet line of said compressor for generating a signal in response to the pressure of the gaseous fuel therein;

a pressure difference sensor for generating a signal in response to a difference in pressure between the fuel pressure in said inlet line of said casing and the pressure inside said fittings chamber; and a control device in said fittings chamber connected to each of said sensors to receive each said signal therefrom, said control device being connected to said inlet valve and said discharge valve to control said inlet valve and said discharge valve in dependence on said signals.

22. A device as set forth in claim 21 which further comprises a safety valve in said fittings chamber and adjustable to a preset maximum pressure, said safety valve being disposed in communication with said buffer chamber to vent said buffer chamber to said fittings chamber.

23. A device for filling a gaseous fuel container, said device comprising an inlet line for receiving a flow of gaseous fuel from a source of gaseous fuel;

a first discharge line for supplying a flow of compressed gaseous fuel to a gaseous fuel container;

a second discharge line for expelling a flow of compressed gaseous fuel;

a compressor for compressing a flow of gaseous fuel, said compressor having a suction line for receiving a flow of gaseous fuel from said inlet line and an outlet line for supplying a flow of compressed gaseous fuel to said first discharge line;

an inlet shut-off valve in said inlet line;

a pressure tight casing;

a pressure-limiting valve within said casing connected to said outlet line of said compressor, said pressure limiting valve being adjustable to a predetermined maximum pressure of the compressed gaseous fuel;

a discharge valve within said casing connected to said outlet line of said compressor;

a temperature sensor for generating a signal in response to ambient temperature a pressure sensor within said casing connected to said outlet line of said compressor for generating a signal in response to the pressure of the gaseous fuel therein;

a pressure difference sensor within said casing for generating a signal in response to a difference in pressure between the fuel pressure in said inlet line and the pressure inside said casing; and a control device connected to each of said sensors to receive each said signal therefrom, said control device being connected to said inlet valve and said discharge valve to control said inlet valve and said discharge valve in dependence on said signals.

24. A device as set forth in claim 23 wherein said casing has a fittings chamber having said pressure-limiting valve and said discharge valve disposed therein; a buffer chamber disposed in communication with and between said inlet valve and said suction line and disposed in communication with said discharge valve to receive a flow of gaseous fuel therefrom; and a partition wall separating said chambers from each other, and which further comprises a safety valve in said fittings chamber and adjustable to a preset maximum pressure, said safety valve being disposed in communication with said buffer chamber to vent said buffer chamber.

25. A device as set forth in claim 24 wherein said control device is disposed in said fittings chambers.

26. A device for filling a gaseous fuel container, said device comprising an inlet line for receiving a flow of gaseous fuel from a source of gaseous fuel, a first discharge line for supplying a flow of compressed gaseous fuel to a gaseous fuel container; a second discharge line for expelling a flow of compressed a gaseous fuel;

a compressor for compressing a flow of gaseous fuel, said compressor having a suction line for receiving a flow of gaseous fuel and an outlet line for supplying a flow of compressed gaseous fuel to said first discharge line;

a safety unit having a fittings chamber in communication with said second discharge line, a buffer chamber and a partition wall separating said chambers, said inlet line passing through said fittings chamber into said buffer chamber to deliver gaseous fuel thereto;

an inlet shut-off valve in said inlet line;

a pressure-limiting valve connected to said outlet line of said compressor and disposed in said fittings chamber, said pressure limiting valve being adjustable to a predetermined maximum pressure of the compressed gaseous fuel;

a discharge valve connected to and between said outlet line of said compressor and said buffer chamber for selectively venting gaseous fuel from said outlet line to said buffer chamber;

a temperature sensor for generating a signal in response to ambient temperature;

a pressure sensor connected to said outlet line of said compressor for generating a signal in response to the pressure of the gaseous fuel therein;

a pressure difference sensor for generating a signal in response to a difference in pressure between the fuel pressure in said inlet line and the pressure inside said fittings chamber; and a control device connected to each of said sensors to receive each said signal therefrom, said control device being connected to said inlet valve and said discharge valve to control said inlet valve and said discharge valve in dependence on said signals.

27. A device as set forth in claim 26 wherein said control device is disposed in said fittings chamber.

* * * * *

UNITED STATES PATENT AND TRADEMARK OFFICE
CERTIFICATE OF CORRECTION

PATENT NO. : 4,966,206
DATED : Oct. 30, 1990
INVENTOR(S) : HEINZ BAUMANN, et al

It is certified that error appears in the above-identified patent and that said Letters Patent is hereby corrected as shown below:

```
In the Abstract, line 20 change "to" to -of-
Column 5, line 17 change "chammber" to -chamber-
Column 7, lines 48 to 49 change "said inlet valve ... discharge
   valve and" to -each of said inlet valve and said outlet valve
   and an inlet side of-
Column 9, line 4 change "press-limiting" to -pressure-limiting-
Column 9, line 57 change "temperature" to -temperature;-
Column 7, line 38, change "claim 1" to --claim 2--.
```

Signed and Sealed this

Thirteenth Day of October, 1992

Attest:

DOUGLAS B. COMER

*Attesting Officer*  *Acting Commissioner of Patents and Trademarks*